US011032832B2

(12) United States Patent
Kwok et al.

(10) Patent No.: US 11,032,832 B2
(45) Date of Patent: Jun. 8, 2021

(54) TIME-DIVISION MULTIPLEXING FOR CELLULAR DUAL CONNECTIVITY

(71) Applicant: T-Mobile USA, Inc., Bellevue, WA (US)

(72) Inventors: Ming Shan Kwok, Seattle, WA (US); Wei-Ming Lan, Morrisville, NC (US); Yasmin Karimli, Kirkland, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/217,939

(22) Filed: Dec. 12, 2018

(65) Prior Publication Data

US 2019/0380135 A1    Dec. 12, 2019

Related U.S. Application Data

(60) Provisional application No. 62/681,510, filed on Jun. 6, 2018.

(51) Int. Cl.
*H04W 72/12* (2009.01)
*H04J 4/00* (2006.01)
(Continued)

(52) U.S. Cl.
CPC .......... *H04W 72/1257* (2013.01); *H04J 4/00* (2013.01); *H04L 5/0012* (2013.01);
(Continued)

(58) Field of Classification Search
CPC ......... H04W 52/00–60; H04W 72/1257; H04J 4/00; H04L 5/0012
See application file for complete search history.

(56) References Cited

U.S. PATENT DOCUMENTS

2018/0091284 A1*  3/2018  Min ................ H04L 5/1469
2019/0320396 A1* 10/2019  Bagheri ........... H04W 72/1289

FOREIGN PATENT DOCUMENTS

| CN | WO2018021821 A1 | 2/2018 |
| GB | WO2018029493 A1 | 2/2018 |
| WO | WO2018064009 A1 | 4/2018 |

OTHER PUBLICATIONS

Huawei, et. at., "Discussion on remaining issues for SUL and EN-DC", R1-1803656, 3GPP TSG RAN WG1 Meeting No. 92bis, Apr. 7, 2018, Section 1, pp. 1-20.

(Continued)

*Primary Examiner* — Raymond S Dean
(74) *Attorney, Agent, or Firm* — Lee & Hayes, P.C.

(57) ABSTRACT

A cellular communication device is configured to use Non-Standalone Architecture (NSA) for communicating with a cellular communication network using $4^{th}$-Generation (4G) Long-Term Evolution (LTE) and $5^{th}$-Generation (5G) New Radio (NR) radio access technologies. In NSA mode, the device may receive separate transmit power control commands for LTE and NR transmissions, respectively. In some situations, the cellular communication device may be commanded to use LTE and NR transmit powers that when combined would exceed regulatory limits or performance limits. In these situations, LTE and NR uplink transmissions are scheduled to implement time-division multiplexing, so that the LTE and NR uplink transmissions occur during different time intervals rather than concurrently.

19 Claims, 3 Drawing Sheets

(51) Int. Cl.
*H04L 5/00* (2006.01)
*H04W 52/14* (2009.01)
*H04W 52/32* (2009.01)
*H04W 52/42* (2009.01)
*H04W 52/36* (2009.01)

(52) U.S. Cl.
CPC ....... *H04W 52/146* (2013.01); *H04W 52/327* (2013.01); *H04W 52/367* (2013.01); *H04W 52/42* (2013.01)

(56) References Cited

OTHER PUBLICATIONS

LG Electronics, "Remaining issues in NR LTE coexistence", R1-1715904, 3GPP TSG RAN WG1 Meeting NR No. 3, Sep. 12, 2017, sections 1-4, pp. 1-20.
PCT Search Report and Written Opinion dated Sep. 25, 2019, for PCT Application No. PCT/US2019/03516, 9 pages.

* cited by examiner

TIME-DIVISION MULTIPLEXING FOR CELLULAR DUAL CONNECTIVITY

CROSS-REFERENCE TO RELATED APPLICATION

This application claims priority to a commonly owned U.S. Provisional Patent Application No. 62/681,510 filed on Jun. 6, 2018, and titled "Time Division Multiplexing on Uplink Transmission for Multiple Radio Access," which is herein incorporated by reference in its entirety.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

A communication protocol defined by the 3GPP, referred to as Non-Standalone Architecture (NSA), specifies the concurrent use of LTE and NR for communications between a mobile device and a communication network. Specifically, NSA uses Dual Connectivity (DC), in which a user equipment (UE) uses both an LTE carrier and an NR carrier for uplink transmissions to corresponding 4G and 5G base stations. The LTE carrier is used for control-plane messaging and for user-plane communications. The NR carrier is used for additional user-plane bandwidth. In a scenario such as this, the LTE carrier is said to "anchor" the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are components and techniques for managing radio-frequency (RF) transmit power of a cellular communication device that is operating in Non-Standalone Architecture (NSA), in which concurrent data uplinks from the device are established using $4^{th}$-Generation (4G) and $5^{th}$-Generation (5G) radio access technologies, respectively. Long-Term Evolution (LTE) is an example of 4G radio access technology. New Radio (NR) is an example of 5G radio access technology.

In a described embodiment, a first portion of a data stream is transmitted using an LTE uplink and a second portion is transmitted using an NR uplink.

When concurrently using the LTE and NR uplinks, the combined radio transmit power of the device is to remain below a regulated maximum allowed transmit power. In addition, certain combinations of radio frequencies used respectively for the LTE and NR uplinks may call for lower transmit powers in order to reduce intermodulation distortion (IMD) that might occur at higher power levels.

In a described embodiment, LTE and NR uplink transmissions from the device are time-multiplexed when circumstances are such that transmitting concurrently would either exceed the maximum allowed transmit power or would result in unacceptable IMD. More specifically, under these conditions the LTE and NR base stations of a network cell cooperate to schedule uplink transmissions during alternating time intervals. This allows each of the uplinks to operate at up to the maximum allowed transmit power.

Figure 1:
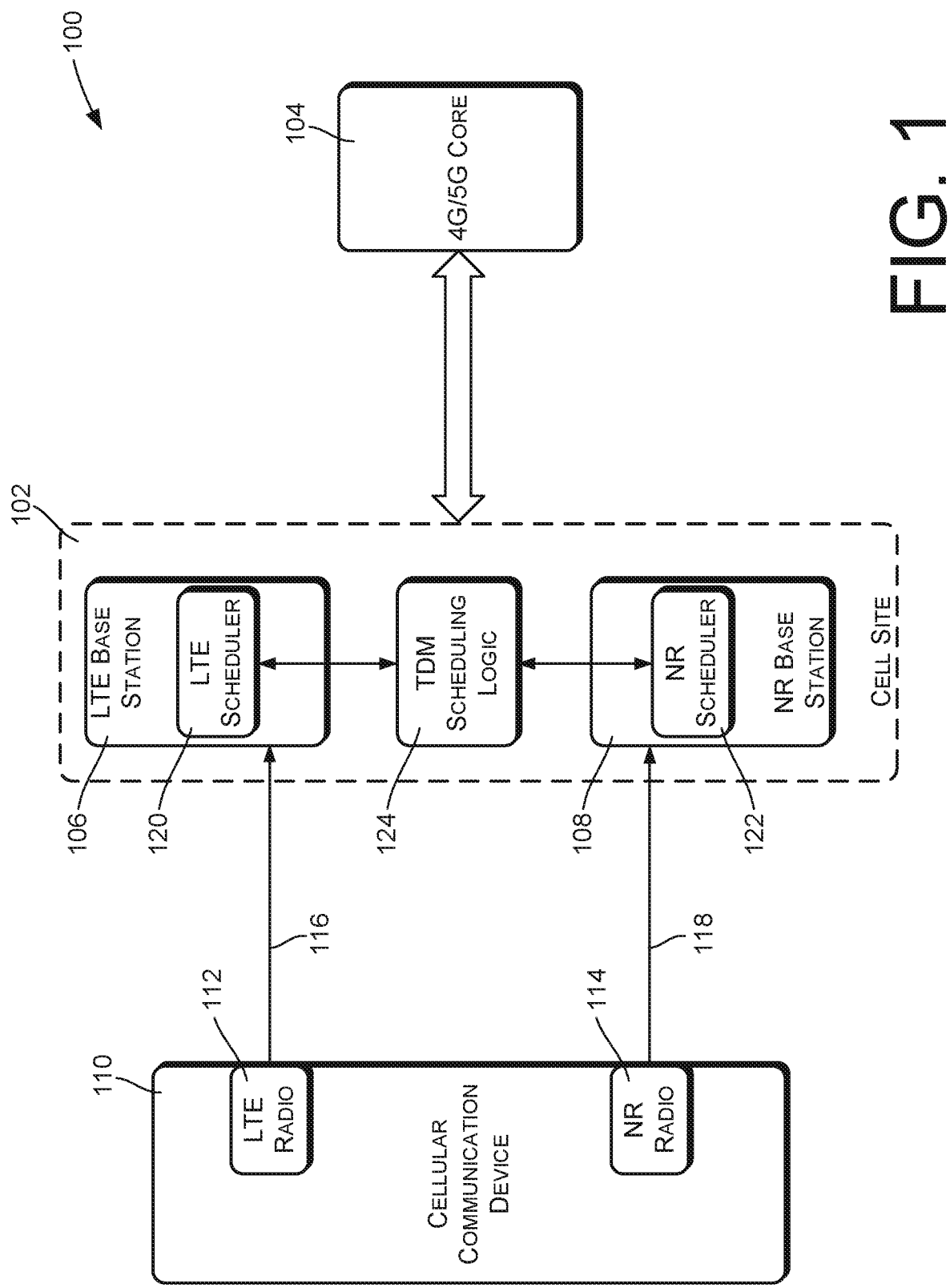
FIG. 1 is a block diagram of a cellular communication system configured to implement dual connectivity.

FIG. 1 illustrates relevant high-level components of a cellular communication system 100 in which the described techniques may be implemented. The components shown in FIG. 1 may be used to implement Dual-Connectivity, for use in a Non-Standalone Architecture (NSA) configuration. When using NSA, a communication device establishes an LTE carrier and an NR carrier, and uses both carriers concurrently for uplink transmissions to respective LTE and NR base stations. The LTE carrier is used for control-plane messaging and for user-plane communications. The NR carrier is used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

The system 100 includes a cell site 102, which may be one of many such cell sites. The system 100 also has a network core 104, which may be a 4G core, a 5G core, and/or another type of network core.

The cell site 102 has cellular base stations to support both 4G and 5G communications. More specifically, the cell site 102 has an LTE base station 106 such as used in 4G cellular networks, and an NR base station 108 such as used in 5G cellular networks. An LTE base station is often referred to as an eNodeB. An NR base station is often referred to as a gNodeB. An eNodeB is a base station that implements 4G LTE radio access technologies. A gNodeB is a base station that implements 5G NR radio access technologies.

The system 100 supports multiple cellular communication devices, of which a single cellular communication device 110 is shown in FIG. 1. The cellular communication device 110 is often referred to as a User Equipment (UE) or Mobile Station (MS) in communication systems such as this.

The device 110 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc.

The device 110 has an LTE radio 112 and an NR radio 114, as well as associated components not shown, which communicate with the LTE base station 106 and the NR base station 108, respectively. The LTE radio 112 and its associated logic implements 4G LTE communication protocols. The NR radio and its associated logic implements 5G NR communication protocols.

During use, the device 110 communicates with the network core 104 through the base stations 106 and 108 of the cell site 102. The device 110 may select and use base stations of different cell sites 102 as the device 110 moves from location to location.

When transmitting, the device 110 sends some of the uplink data in an LTE data stream and some of the uplink data in an NR data stream. The LTE and NR data streams are modulated and transmitted by the LTE radio 112 and the NR radio 114, respectively. For purposes of discussion, the portion of uplink data that is transmitted using LTE radio access technology will be referred to as LTE data. The portion of uplink data that is transmitted using NR radio access technology will be referred to as NR data.

When the cellular communication device 110 is configured to use NSA Dual Connectivity, the cellular communication device 110 establishes a primary radio uplink 116 with the LTE base station 106 and a secondary radio uplink 118 with the NR base station 108. The primary radio uplink 116, which will also be referred to herein as an LTE uplink 116, is a wireless communication channel that uses LTE radio access technology to transmit the LTE data. The secondary radio uplink 118, which will also be referred to herein as an NR uplink 118, is a wireless communication channel that uses NR radio access technology to transmit the NR data.

The base stations 106 and 108 periodically send Transmit Power Control (TPC) commands to the device 110, commanding the device 110 to transmit an LTE uplink signal at a first transmit power and to transmit an NR uplink signal at a second transmit power. In the following discussion, the first transmit power of the LTE uplink signal will be referred to as the LTE transmit power, and the second transmit power of the NR uplink signal will be referred to as the NR transmit power.

Before transmitting LTE or NR data, the device 110 sends scheduling requests to the LTE and NR base stations. The LTE base station 106 has scheduling logic 120, referred to here as an LTE scheduler 120, that schedules uplink transmissions for user plane LTE data in response to scheduling requests from the device 110. The NR base station 108 has scheduling logic 122, referred to here as an NR scheduler 122, that schedules uplink transmissions for user plane NR data in response to scheduling requests from the device 110. Transmissions are scheduled by responding to scheduling requests with specifications of specific time intervals for uplink transmissions.

The cell site 102 has time-division multiplexing (TDM) scheduling logic 124 that responds to certain conditions by scheduling LTE and NR uplink transmissions so that only one of the LTE radio 112 and the NR radio 114 is transmitting at any given time. Although shown and described herein as a separate logical component, the TDM scheduling logic 124 may be implemented by the LTE scheduler 120, the NR scheduler 122, or in part by the LTE scheduler 120, the NR scheduler 122, and/or other components or entities.

The TDM scheduling logic 124 is configured to pause concurrent LTE/NR uplink transmissions, and to initiate time-division multiplexing of the LTE and NR uplink signals, when one or more of the LTE transmit power and NR transmit power exceed one or more power thresholds. Power thresholds may be based on various criteria, depending on implementation, and may vary by device and/or by other conditions such as the frequencies of the LTE and NR uplinks. As one example, time-division multiplexing may be used when a total of the LTE transmit power and the NR transmit power exceed a predefined threshold such as the maximum legally allowed output power of the device 110.

As another example, time-division multiplexing may be implemented when the currently commanded LTE transmit power or the currently commanded NR transmit power exceeds a respectively corresponding threshold. In some embodiments, each of the LTE and NR radios might be allowed to transmit up to half of the maximum allowed total output power, concurrently, and time-division multiplexing may be implemented whenever the transmit power of either of the LTE and NR uplink signals exceeds half of the maximum allowed total output power.

As another example, there may be situations in which requested output power would cause unacceptable 1 MB within the device 110, and time-division multiplexing may be implemented in these situations. Situations such as this may occur more often when certain combinations of LTE and NR frequencies are being used for uplink transmissions, and when the device is relatively distant from the LTE and NR base stations. The device 110 may be configured, depending on its characteristics and performance, to provide an indication to the LTE and NR base stations 106 and 108 when requested LTE and NR power levels will cause an undesirable level of IMD. The TDM scheduling logic 124 may respond by initiating time-division multiplexing.

In order to implement multiplexing, the scheduling logic 124 grants scheduling requests to allow only one of the LTE and NR radios 112 and 114 to transmit at any given time. Specifically, LTE scheduling requests are granted to allow the LTE radio 112 to transmit during first time intervals and to allow the NR radio 114 to transmit during second time intervals, wherein the second time intervals are exclusive of and interleaved among the first time intervals. Time intervals such as these are referred to as Transmission Time Intervals (TTIs) in 4G and 5G environments. From available TTIs, LTE uplink transmissions are scheduled to occur during a first set of TTIs, while NR uplink transmissions are scheduled to occur during a second set of TTIs, where the TTIs of the first and second sets are mutually exclusive.

In some implementations, one or the other of the LTE and NR uplinks may be given relatively more TTIs, based on one of the uplinks having a higher demand or larger transmission queue at the device 110. If the LTE transmission queue of the device 110 is larger than the NR transmission queue, for example, more TTIs may be assigned to the LTE uplink.

Figure 2:
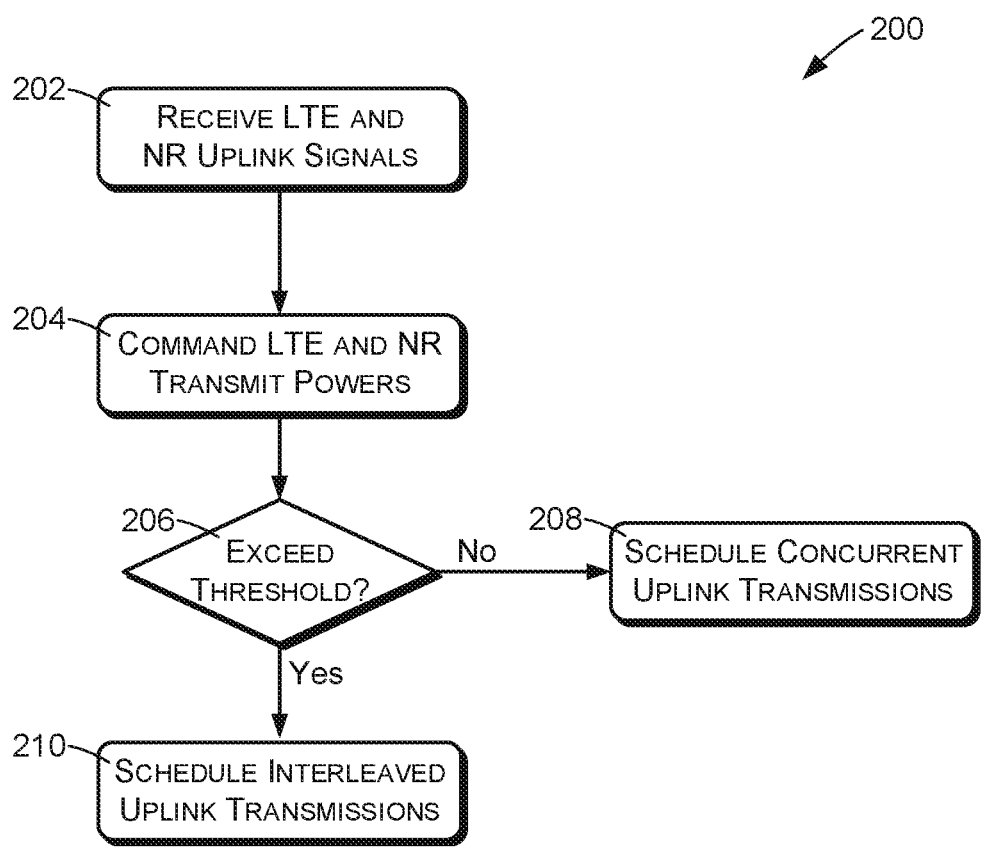
FIG. 2 is a flow diagram illustrating an example method of implementing time-division multiplexing of 4G and 5G uplinks.

FIG. 2 illustrates an example method 200 that may be performed by components of one or more cell sites to mitigate uplink transmission power issues when operating using Dual Connectivity, such as when operating in an NSA mode of a 5G communication network or a hybrid 4G/5G communication network. For purposes of discussion, certain actions of the method 200 will be described as being performed by the TDM scheduling logic 124, with it being understood that this logic may be implemented by the LTE base station 106, the NR base station 108, the cellular communication device 110, and/or other components and network entities.

An action 202 comprises receiving concurrently transmitted LTE and NR uplink signals from the device 110. The LTE uplink signals are received by the LTE base station 106. The NR uplink signals are received by the NR base station 108.

An action 204 comprises commanding the cellular communication device to transmit LTE and NR uplink signals at specified transmit powers. Specifically, the LTE base station 106 commands the cellular communication device 110 to transmit the LTE uplink signal at a first transmit power, referred to herein as the LTE transmit power, and the NR base station 108 commands the cellular communication device 110 to transmit the NR uplink signal at a second transmit power, referred to herein as the NR transmit power. The LTE and NR transmit powers are determined independently of each other, by the LTE and NR base stations 106 and 108, so as to achieve adequate LTE and NR uplink signal strengths at the LTE and NR base stations 106 and 108. As described above, the total of the commanded LTE transmit power and the commanded NR transmit power may at times exceed regulatory limits or other limits.

An action 206, performed by the scheduling logic 124, comprises determining whether one or more of the first and second transmit powers will cause the uplink transmit power of the device to exceed a power threshold.

In some cases, the power threshold may comprise a maximum allowed transmit power for the device 110, and the action 206 may comprise determining whether a total of the first and second transmit powers exceeds the maximum allowed transmit power of the device 110.

In some cases, the maximum allowed output power may be a regulatory limit. In other cases, a separate power threshold may be specified for each of the LTE and NR uplinks, and the action 206 may comprise determining whether either of the LTE and NR uplink signals exceeds its corresponding power threshold. Individual thresholds such as this may be less than the maximum allowed output power of the device 110. As one example, the power threshold for each of the LTE and NR uplink signals may be 50% of the maximum allowed transmit power.

In some cases, the action 206 may be based at least in part on information provided by the device 110. For example, a transmit power threshold may be particular to the device 110, and the scheduling logic 124 may receive a notification from the device of the device-specific transmit power threshold. Alternatively, the scheduling logic 124 may receive a notification from the device 110 that the commanded LTE and/or NR transmission powers exceed a device-specific transmit power threshold.

An individual device may specify different power thresholds for different LTE/NR frequency combinations in some embodiments. When the LTE and NR uplinks are using frequencies that are near each other, for example, the device 110 may specify a lower transmit power threshold in order to avoid intermodulation distortion (IMD). When the LTE and NR uplink frequencies are further apart, such as being in different bands, the device 110 may specify a higher transmit power threshold.

In response to determining that a power threshold has not been exceeded in the action 206, an action 208 is performed of scheduling concurrent LTE and NR uplink signals. As an example, the LTE scheduler 120 and the NR scheduler 122 may be allowed to independently schedule uplink transmissions, without interference by the TDM scheduling logic 124.

In response to determining that one or more of the first and second transmit powers exceed the power threshold, an action 210 is performed by the scheduling logic 124. The action 210 comprises managing uplink scheduling of the device 110 to time-multiplex the LTE and NR uplink signals of the device 110. Generally, the action 210 comprises scheduling LTE and NR uplink transmissions to occur at different times, rather than concurrently. In particular, the action 210 may comprise scheduling LTE uplink transmissions to occur during certain time intervals or TTIs, and scheduling NR uplink transmissions to occur during other time intervals or TTIs.

In LTE and NR environments, the action 210 may comprise receiving LTE scheduling requests from the device 110 for LTE radio transmissions and receiving NR scheduling requests from the device 110 for NR radio transmissions. The LTE scheduling requests are received by the LTE scheduler 120. The NR scheduling requests are received by the NR scheduler 122. The action 210 may further comprise, in response to receiving the scheduling requests, granting the scheduling requests such that NR uplink transmissions are interleaved with LTE uplink transmissions. Specifically, the TDM scheduling logic 124 grants the LTE scheduling requests to allow LTE uplink transmissions to occur during respective first time intervals, and grants the NR scheduling requests to allow NR uplink transmissions to occur during respective second time intervals, wherein the second time intervals are interleaved with the first time intervals.

In some implementations, the TDM scheduling logic 124 may be implemented primarily by the NR base station 108. In these implementations, the action 210 may comprise receiving information from the LTE base station 106, where the information identifies timing of LTE uplink transmissions by the device 110. More specifically, the information may identify first time intervals for which LTE uplink transmissions are scheduled. Upon receiving NR scheduling requests from the device 110, the scheduling logic grants the NR scheduling requests to allow NR uplink transmissions of the device 110 to be multiplexed among the LTE uplink transmissions of the device 110. That is, the scheduling logic 124 specifies second time intervals for NR uplink transmissions, where the second time intervals are interleaved with the first time intervals. Alternatively stated, the NR base station identifies the time intervals that are being used for LTE uplink transmissions and specifies different time intervals for NR uplink transmission.

In some implementations, managing the LTE and NR uplink scheduling may be based at least in part on uplink demand. For example, the action 210 may include determining an expected LTE uplink demand, determining an expected NR uplink demand, and scheduling LTE and NR uplink transmissions based at least in part on the expected LTE uplink demand and the expected NR uplink demand, where the uplink having the higher demand is given priority when granting scheduling requests.

Figure 3:
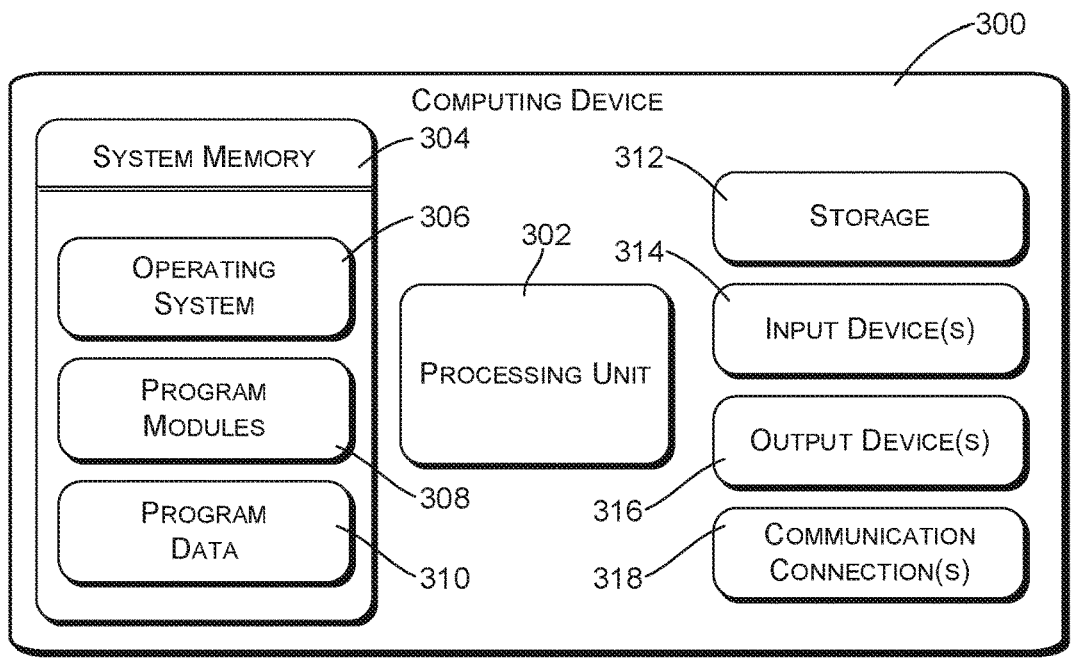
FIG. 3 is a block diagram of an example computing device that may be used to implement various functionality described herein.

FIG. 3 is a block diagram of an illustrative computing device 300 that may be used to implement various components of a cellular communication system, such as servers, routers, gateways, administrative components, etc. One or more computing devices 300 may be used to implement each of the base stations 106 and 108, for example. The computing device 300 may also be used to implement the TDM scheduling logic 124.

In various embodiments, the computing device 300 may include at least one processing unit 302 and system memory 304. Depending on the exact configuration and type of computing device, the system memory 304 may be volatile (such as RAM), non-volatile (such as ROM, flash memory, etc.) or some combination of the two. The system memory 304 may include an operating system 306, one or more program modules 308, and may include program data 310.

The computing device 300 may also include additional data storage devices (removable and/or non-removable) such as, for example, magnetic disks, optical disks, or tape. Such additional storage devices are illustrated in FIG. 3 as storage 312.

Non-transitory computer storage media of the computing device 300 may include volatile and nonvolatile, removable and non-removable media implemented in any method or technology for storage of information, such as computer readable instructions, data structures, program modules, or other data. The system memory 304 and storage 312 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 300. Any such non-transitory computer-readable storage media may be part of the computing device 300.

In various embodiment, any or all of the system memory 304 and storage 312 may store programming instructions which, when executed, implement some or all of the function functionality described above as being implemented by the base stations 106 and 108, as well as the TDM scheduling logic 124.

The computing device 300 may also have input device(s) 314 such as a keyboard, a mouse, a touch-sensitive display, voice input device, etc. Output device(s) 316 such as a display, speakers, a printer, etc. may also be included. The computing device 300 may also contain communication connections 318 that allow the device to communicate with other computing devices.

Figure 4:
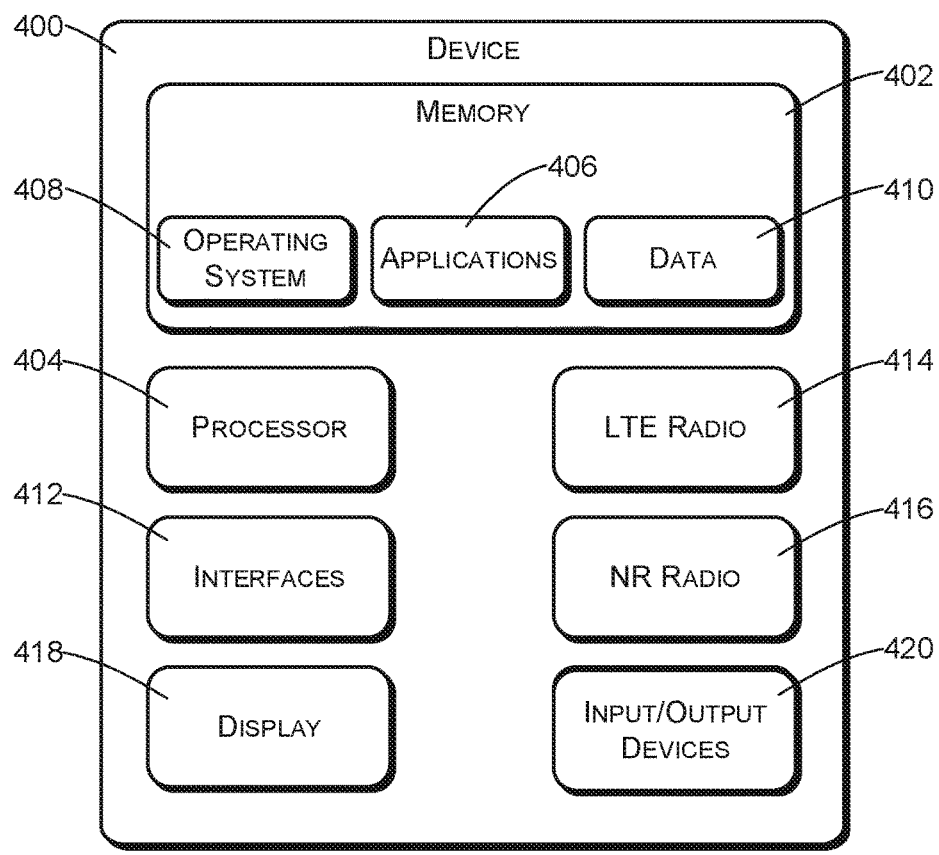
FIG. 4 is a block diagram of an example cellular communication device.

FIG. 4 illustrates high-level components of an example cellular communication device 400 that may be used to implement the techniques described herein. The device 400 is an example of a cellular communication device 110 as shown in FIG. 1. FIG. 4 shows only basic, high-level components of the device 400.

The device 400 may include memory 402 and a processor 404. The memory 402 may include both volatile memory and non-volatile memory. The memory 402 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 402 may include a SIM (subscriber identity module), which is a removable smart card used to identify a user of the device 400 to a service provider network.

The memory 402 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 402 may in some cases include storage media used to transfer or distribute instructions, applications, and/or data. In some cases, the memory 402 may include data storage that is accessed remotely, such as network-attached storage that the device 400 accesses over some type of data communication network.

The memory 402 stores one or more sets of computer-executable instructions (e.g., software) such as programs that embody operating logic for implementing and/or performing desired functionality of the device 400. The instructions may also reside at least partially within the processor 404 during execution thereof by the device 400. Generally, the instructions stored in the computer-readable storage media may include various applications 406 that are executed by the processor 404, an operating system (OS) 408 that is also executed by the processor 404, and data 410.

In some embodiments, the processor(s) 404 is a central processing unit (CPU), a graphics processing unit (GPU), both CPU and GPU, or other processing unit or component known in the art. Furthermore, the processor(s) 404 may include any number of processors and/or processing cores. The processor(s) 404 is configured to retrieve and execute instructions from the memory 402.

The device 400 may have interfaces 412, which may comprise any sort of interfaces known in the art. The interfaces 412 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 400 may also have an LTE radio 414 and an NR radio 416, which may be used as described above for implementing dual connectivity in conjunction with LTE and NR base stations as described above.

The device 400 may have a display 418, which may comprise a liquid crystal display or any other type of display commonly used in telemobile devices or other portable devices. For example, the display 418 may be a touch-sensitive display screen, which may also act as an input device or keypad, such as for providing a soft-key keyboard, navigation buttons, or the like.

The device 400 may have input and output devices 420. These devices may include any sort of output devices known in the art, such as a display (already described as display 418), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by one or more of a Long-Term Evolution (LTE) base station or a New Radio (NR) Base Station, the method comprising:

concurrently receiving a LTE uplink signal and a NR uplink signal from a cellular communication device;
commanding the cellular communication device to transmit the LTE uplink signal at a first transmit power;
commanding the cellular communication device to transmit the NR uplink signal at a second transmit power;
determining that one or more of the first transmit power and the second transmit power will cause the cellular communication device to exceed a power threshold; and
in response to determining that one or more of the first transmit power and the second transmit power will cause the cellular communication device to exceed the power threshold, managing uplink scheduling of the cellular communication device to time-multiplex the LTE and NR uplink signals.

2. The method of claim 1, wherein determining that one or more of the first transmit power and the second transmit power will cause the cellular communication device to exceed the power threshold comprises determining that a total of the first transmit power and the second transmit power exceeds a maximum allowed transmit power of the cellular communication device.

3. The method of claim 1, wherein determining that one or more of the first transmit power and the second transmit power will cause the cellular communication device to exceed the power threshold comprises receiving a notification from the cellular communication device.

4. The method of claim 1, wherein the power threshold is less than a maximum allowed transmit power of the cellular communication device.

5. The method of claim 1, wherein managing the uplink scheduling comprises:
receiving LTE scheduling requests from the cellular communication device;
receiving NR scheduling requests from the cellular communication device;
granting the LTE scheduling requests to allow LTE uplink transmissions to occur during respective first time intervals; and
granting the NR scheduling requests to allow NR uplink transmissions to occur during respective second time intervals;
wherein the second time intervals are interleaved with the first time intervals.

6. The method of claim 1, wherein managing the uplink scheduling comprises:
receiving information from an LTE base station, the information identifying first time intervals for LTE uplink transmissions; and
specifying, by an NR base station, second time intervals for NR uplink transmissions, the second time intervals being interleaved with the first time intervals.

7. The method of claim 1, further comprising:
determining an expected LTE uplink demand; and
determining an expected NR uplink demand;
wherein managing the uplink scheduling is based at least in part on the expected LTE uplink demand and the expected NR uplink demand.

8. A cellular communication system, comprising:
a Long-Term Evolution (LTE) base station that receives LTE scheduling requests from a cellular communication device, wherein the LTE scheduling requests are for an LTE uplink;
a New Radio (NR) base station that receives NR scheduling requests from the cellular communication device, wherein the NR scheduling requests are for an NR uplink; and
scheduling logic at one or more of the LTE base station or the NR base station, the scheduling logic configured to determine that concurrent transmission by the cellular communication device of an LTE uplink signal and an NR uplink signal will cause a transmit power of the cellular communication device to exceed a power threshold and in response to (a) grant the LTE scheduling requests to allow LTE uplink transmissions to occur during respective first time intervals, and (b) grant the NR scheduling requests to allow NR uplink transmissions to occur during respective second time intervals, wherein the second time intervals are interleaved with the first time intervals.

9. The cellular communication system of claim 8, wherein the scheduling logic is implemented at least in part by the NR base station.

10. The cellular communication system of claim 8, wherein the scheduling logic is implemented at least in part by the LTE base station and at least in part by the NR base station.

11. The cellular communication system of claim 8, wherein determining that the concurrent transmission by the cellular communication device of the LTE uplink signal and the NR uplink signal will cause the transmit power of the cellular communication device to exceed the power threshold is based at least in part on information provided by the cellular communication device.

12. The cellular communication system of claim 8, wherein determining that the concurrent transmission by the cellular communication device of the LTE uplink signal and the NR uplink signal will cause transmit power of the cellular communication device to exceed the power threshold comprises determining that a total of an LTE transmit power and an NR transmit power will exceed a maximum allowed transmit power of the cellular communication device.

13. The cellular communication system of claim 8, wherein determining that the concurrent transmission by the cellular communication device of the LTE uplink signal and the NR uplink signal will cause transmit power of the cellular communication device to exceed the power threshold comprises determining that at least one of the LTE uplink signal and the NR uplink signal will exceed the power threshold.

14. The cellular communication system of claim 8, wherein the scheduling logic is responsive to expected LTE uplink demand and expected NR uplink demand to grant the LTE scheduling requests and the NR scheduling requests.

15. A system at one or more of a Long-Term Evolution (LTE) base station or a New Radio (NR) Base Station, comprising:
one or more processors;
one or more non-transitory computer-readable media storing computer-executable instructions that, when executed by the one or more processors, cause the one or more processors to perform actions comprising:
receiving information that identifies timing of Long-Term Evolution (LTE) uplink transmissions by a cellular communication device;
receiving, from the cellular communication device, New Radio (NR) scheduling requests for an NR uplink;

determining that concurrent LTE and NR uplink transmissions by the cellular communication device will cause the cellular communication device to exceed a power threshold; and in response to determining that the concurrent LTE and NR uplink transmissions will cause the cellular communication device to exceed the power threshold, granting the NR scheduling requests to allow NR uplink transmissions of the cellular communication device to be multiplexed among the LTE uplink transmissions of the cellular communication device.

16. The system of claim 15, wherein determining that the concurrent LTE and NR uplink transmissions will cause transmit power of the cellular communication device to exceed a cellular communication device the power threshold comprises receiving information from the cellular communication device.

17. The system of claim 15, wherein determining that the concurrent LTE and NR uplink transmissions will cause the cellular communication device to exceed the power threshold comprises determining that a total of an LTE transmit power and an NR transmit power will exceed a maximum allowed transmit power of the cellular communication device.

18. The system of claim 15, determining that the concurrent LTE and NR uplink transmissions will cause the cellular communication device to exceed the power threshold comprises receiving an indication from the cellular communication device that the concurrent LTE and NR uplink transmissions will cause the cellular communication device to exceed the power threshold.

19. The system of claim 15, the actions further comprising:
  determining an expected LTE uplink demand; and
  determining an expected NR uplink demand;
  wherein granting the NR scheduling requests is based at least in part on the expected LTE uplink demand and at least in part on the expected NR uplink demand.

* * * * *